US012795730B2

(12) United States Patent
Turtinen et al.

(10) Patent No.: US 12,795,730 B2
(45) Date of Patent: Nov. 10, 2026

(54) ENABLING ACCESS FOR A REDUCED CAPABILITY NEW RADIO (NR) DEVICE

(71) Applicant: NOKIA TECHNOLOGIES OY, Espoo (FI)

(72) Inventors: Samuli Turtinen, Ii (FI); Jussi-Pekka Koskinen, Oulu (FI); Jorma Kaikkonen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 249 days.

(21) Appl. No.: 17/910,307

(22) PCT Filed: Jan. 22, 2021

(86) PCT No.: PCT/FI2021/050038
§ 371 (c)(1),
(2) Date: Sep. 8, 2022

(87) PCT Pub. No.: WO2021/181001
PCT Pub. Date: Sep. 16, 2021

(65) Prior Publication Data

US 2023/0133904 A1 May 4, 2023

Related U.S. Application Data

(60) Provisional application No. 62/988,607, filed on Mar. 12, 2020.

(51) Int. Cl.
*H04W 74/08* (2024.01)
*H04L 1/00* (2006.01)
(Continued)

(52) U.S. Cl.
CPC ..... *H04W 74/0833* (2013.01); *H04W 74/006* (2013.01); *H04W 74/0836* (2024.01)

(58) Field of Classification Search
CPC ........... H04W 74/006; H04W 74/0833; H04W 56/001; H04W 48/12; H04W 8/24;
(Continued)

(56) References Cited

U.S. PATENT DOCUMENTS

| | | | | |
|---|---|---|---|---|
| 12,022,492 | B2 * | 6/2024 | Takeda | H04L 5/0048 |
| 2013/0064119 | A1 | 3/2013 | Montojo et al. | |

(Continued)

FOREIGN PATENT DOCUMENTS

| | | | |
|---|---|---|---|
| EP | 3 611 990 | A1 | 2/2020 |
| EP | 3621372 | A1 | 3/2020 |

(Continued)

OTHER PUBLICATIONS

International Search Report and Written Opinion dated Apr. 23, 2021 corresponding to International Patent Application No. PCT/FI2021/050038.

(Continued)

*Primary Examiner* — Edan Orgad
*Assistant Examiner* — Vanneilian Lalchinthang
(74) *Attorney, Agent, or Firm* — Alston & Bird LLP

(57) ABSTRACT

Systems, methods, apparatuses, and computer program products for enabling access for a reduced capability new radio (NR) device. For example, a network may indicate which of the configured random access channel (RACH) resources can be used to perform a random access procedure within a reduced uplink (UL) bandwidth (BW) (compared to the whole initial UL bandwidth part (BWP) BW). The network may schedule any UL transmissions (e.g., Msg3 (re-)transmissions, etc.) pertaining to such random access procedure within the reduced UL BW.

18 Claims, 4 Drawing Sheets

(51) Int. Cl.

| | |
|---|---|
| ***H04W 56/00*** | (2009.01) |
| ***H04W 74/00*** | (2009.01) |
| ***H04W 74/0833*** | (2024.01) |
| *H04W 74/0836* | (2024.01) |

(58) Field of Classification Search
CPC ........... H04W 74/0841; H04W 72/044; H04W 74/002; H04W 74/0836; H04B 17/318; H04L 1/0007
USPC .......................................................... 370/329
See application file for complete search history.

(56) References Cited

U.S. PATENT DOCUMENTS

| | | | |
|---|---|---|---|
| 2013/0083753 | A1 | 4/2013 | Lee et al. |
| 2015/0092740 | A1 | 4/2015 | Li et al. |
| 2015/0365976 | A1 | 12/2015 | Lee et al. |
| 2017/0295005 | A1 | 10/2017 | Lee et al. |
| 2019/0069297 | A1* | 2/2019 | Lee ....................... H04L 1/0026 |
| 2019/0191464 | A1* | 6/2019 | Loehr ............... H04W 28/0278 |
| 2019/0223228 | A1* | 7/2019 | Ko ...................... H04W 74/002 |
| 2019/0239255 | A1* | 8/2019 | Stern-Berkowitz .......................... H04L 1/1854 |
| 2019/0357262 | A1* | 11/2019 | Cirik ....................... H04L 5/001 |
| 2020/0053811 | A1* | 2/2020 | Ang .................. H04L 27/26025 |
| 2020/0221308 | A1* | 7/2020 | Liao .................. H04L 27/26025 |
| 2020/0344030 | A1 | 10/2020 | Cheng et al. |
| 2020/0374840 | A1 | 11/2020 | Takeda et al. |
| 2021/0022189 | A1 | 1/2021 | Beale et al. |
| 2021/0051672 | A1* | 2/2021 | Rastegardoost .... H04W 74/006 |
| 2021/0058971 | A1* | 2/2021 | MolavianJazi ....... H04W 72/23 |
| 2021/0168858 | A1* | 6/2021 | Liu ......................... H04L 27/26 |
| 2021/0219346 | A1* | 7/2021 | Agiwal ............. H04W 74/0833 |
| 2022/0225433 | A1* | 7/2022 | Lin ..................... H04W 72/044 |
| 2023/0007524 | A1* | 1/2023 | Wang .................... H04W 48/12 |
| 2023/0070068 | A1 | 3/2023 | Hu et al. |

FOREIGN PATENT DOCUMENTS

| | | | |
|---|---|---|---|
| EP | 3 681 239 | A1 | 7/2020 |
| EP | 3 753 170 | A1 | 12/2020 |
| EP | 4 106 427 | A1 | 12/2022 |
| EP | 4 106 471 | A1 | 12/2022 |
| EP | 4 207 818 | A1 | 7/2023 |
| EP | 4 243 545 | A1 | 9/2023 |
| EP | 4 247 075 | A1 | 9/2023 |
| EP | 4 247 097 | A1 | 9/2023 |
| JP | 2014-531856 | A | 11/2014 |
| JP | 2015-526962 | A | 9/2015 |
| JP | 2016-119683 | A | 6/2016 |
| JP | 2023-514297 | A | 4/2023 |
| KR | 2019/0044141 | A | 4/2019 |
| WO | WO 2013/049768 | A1 | 4/2013 |
| WO | WO 2019/096254 | A1 | 5/2019 |
| WO | WO 2019/150486 | A1 | 8/2019 |
| WO | WO 2019/158649 | A1 | 8/2019 |
| WO | WO 2019/195445 | A1 | 10/2019 |
| WO | WO 2020/017391 | A1 | 1/2020 |
| WO | WO 2021/126045 | A1 | 6/2020 |
| WO | 2021/010786 | A1 | 1/2021 |
| WO | WO 2021/164601 | A1 | 8/2021 |
| WO | WO 2022/027356 | A1 | 2/2022 |

OTHER PUBLICATIONS

Samsung, "Indication of Cat.0 UE capability," 3GPP Draft; R2-144242, 3GPP TSG-RAN2 Meeting #87bis, Shanghai, China, Sep. 26, 2014, XP050870217.
Ericsson, "New SID on support of reduced capability NR devices," RP-193238, 3GPP TSG RAN Meeting #86, Sitges, Spain, Dec. 9-12, 2019.
3GPP TR 22.804 V16.2.0 (Dec. 2018), Technical Report, 3rd Generation Partnership Project, Technical Specification Group Services and System Aspects; Study on Communication for Automation in Vertical Domains (Release 16), Dec. 2018.
3GPP TS 22.104 V17.2.0 (Dec. 2019), Technical Specification, 3rd Generation Partnership Project, Technical Specification Group Services and System Aspects; Service requirements for cyber-physical control applications in vertical domains; Stage 1 (Release 17), Dec. 2019.
3GPP TR 22.832 V17.1.0 (Dec. 2019), Technical Report, 3rd Generation Partnership Project; Technical Specification Group Services and System Aspects; Study on enhancements for cyber-physical control applications in vertical domains; Stage 1 (Release 17), Dec. 2019.
3GPP TS 22.261 V17.1.0 (Dec. 2019), Technical Specification, 3rd Generation Partnership Project; Technical Specification Group Services and System Aspects; Service requirements for the 5G system; Stage 1 (Release 17), Dec. 2019.
3GPP TS 38.331 V15.8.0 (Dec. 2019), Technical Specification, 3rd Generation Partnership Project; Technical Specification Group Radio Access Network; NR; Radio Resource Control (RRC) protocol specification (Release 15), Dec. 2019.
3GPP TS 38.211 V16.0.0 (Dec. 2019), Technical Specification, 3rd Generation Partnership Project; Technical Specification Group Radio Access Network; NR; Physical channels and modulation (Release 16), Dec. 2019.
3GPP TS 38.321 V15.8.0 (Dec. 2019), Technical Specification, 3rd Generation Partnership Project; Technical Specification Group Radio Access Network; NR; Medium Access Control (MAC) protocol specification (Release 15), Dec. 2019.
3GPP TS 38.213 V16.0.0 (Dec. 2019), Technical Specification, 3rd Generation Partnership Project; Technical Specification Group Radio Access Network; NR; Physical layer procedures for control (Release 16), Dec. 2019.
Office Action for Japanese Application No. 2022-554490 dated Sep. 5, 2023, 14 pages.
Office Action dated Jan. 17, 2023, corresponding to Indian Patent Application No. 202247057024.
Decision to Grant for Japanese Application No. 2022-554490 dated Jan. 15, 2024, 4 pages.
Extended European Search Report for European Application No. 21769027.0 dated Feb. 14, 2024, 11 pages.
Office Action for Japanese Application No. 2024-020513 dated Jan. 14, 2025, 17 pages.
Office Action for Indonesian Application No. P00202210833 dated Jul. 1, 2025, 6 pages.
Office Action for Japanese Application No. 2024-020513 dated Jun. 30, 2025, 5 pages.

* cited by examiner

ENABLING ACCESS FOR A REDUCED CAPABILITY NEW RADIO (NR) DEVICE

RELATED APPLICATION

This application was originally filed as PCT Application No. PCT/FI2021/050038 on Jan. 22, 2021, which claims priority from US Provisional Patent Application No. 62/988,607, filed on Mar. 12, 2020, each of which is incorporated herein by reference in its entirety.

CROSS-REFERENCE TO RELATED APPLICATION

This application claims priority to U.S. Provisional Application No. 62/988,607 filed Mar. 12, 2020, which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for enabling access for a reduced capability new radio (NR) device.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, a method may include receiving, by a user equipment (UE), an indication of a configuration for a random access procedure within a bandwidth. The method may include determining a set of resources that the UE can use based on the configuration and a random access channel (RACH) configuration.

In a variant, the indication may be included in system information. In a variant, the indication may comprise one or more bits in the system information. In a variant, the indication may indicate one or more RACH resources that can be used to perform the random access procedure within the bandwidth. In a variant, determining the set of resources may further comprise determining the set of resources based on the one or more indicated RACH resources.

In a variant, the indication may identify a first RACH resource that is within the bandwidth. In a variant, determining the set of resources may further comprise determining the set of resources based on the first RACH resource. In a variant, the indication may identify a control resource set number 0 (CORESET #0) bandwidth. In a variant, determining the set of resources may further comprise determining the set of resources based on the CORESET #0 bandwidth.

In a variant, the indication may comprise time or frequency information that identifies a set of RACH resources that can be used to perform the random access procedure within the bandwidth. In a variant, determining the set of resources may further comprise determining the set of resources based on the time or frequency information. In a variant, the determining the set of resources may further comprise determining that the UE is allowed to use the set of RACH resources, or determining that the UE is not allowed to use one or more other RACH resources not included in the set of RACH resources.

In a variant, the method may further comprise transmitting an indication of a capability of the UE. In a variant, the capability may comprise at least one of: a capability to use the bandwidth, an inability to use an initial bandwidth that is wider than the bandwidth, or a maximum supported bandwidth for the UE. In a variant, the method may further comprise determining the RACH configuration, and determining whether the UE has received the indication. In a variant, the method may further comprise determining the bandwidth based on the configuration for the random access procedure.

In a variant, determining the set of resources may comprise determining one or more random access occasions that can be used to request that a transmission be performed within the bandwidth. In a variant, the method may further comprise performing the random access procedure using the set of resources by transmitting or receiving one or more messages associated with the random access procedure. In a variant, the method may further comprise determining one or more random access resources to use for a transmission based on performing the random access procedure.

According to a second embodiment, a method may include transmitting, by a network node, an indication of a configuration for a random access procedure within a bandwidth. The method may include receiving an indication of a capability of the UE. The capability may comprise at least one of: a capability to use the bandwidth, an inability to use an initial bandwidth that is wider than the bandwidth, or a maximum supported bandwidth for the UE.

In a variant, the indication may be included in system information. In a variant, the indication may comprise one or more bits in the system information. In a variant, the indication may indicate one or more RACH resources that can be used to perform the random access procedure within the bandwidth. In a variant, the indication may identify a first RACH resource that is within the bandwidth.

In a variant, the indication may identify a control resource set number 0 (CORESET #0) bandwidth. In a variant, the indication may comprise time or frequency information that identifies a set of RACH resources that can be used to perform the random access procedure within the bandwidth.

A third embodiment may be directed to an apparatus including at least one processor and at least one memory comprising computer program code. The at least one memory and computer program code may be configured, with the at least one processor, to cause the apparatus at least to perform the method according to the first embodiment or the second embodiment, or any of the variants discussed above.

A fourth embodiment may be directed to an apparatus that may include circuitry configured to cause the apparatus to perform the method according to the first embodiment or the second embodiment, or any of the variants discussed above.

A fifth embodiment may be directed to an apparatus that may include means for performing the method according to the first embodiment or the second embodiment, or any of the variants discussed above. Examples of the means may include one or more processors, memory, and/or computer program codes for causing the performance of the operation.

A sixth embodiment may be directed to a computer readable medium comprising program instructions stored thereon for causing an apparatus to perform at least the method according to the first embodiment or the second embodiment, or any of the variants discussed above.

A seventh embodiment may be directed to a computer program product encoding instructions for causing an apparatus to perform at least the method according to the first embodiment or the second embodiment, or any of the variants discussed above.

BRIEF DESCRIPTION OF THE DRAWINGS

For proper understanding of example embodiments, reference should be made to the accompanying drawings, wherein.

DETAILED DESCRIPTION

Figure 1:
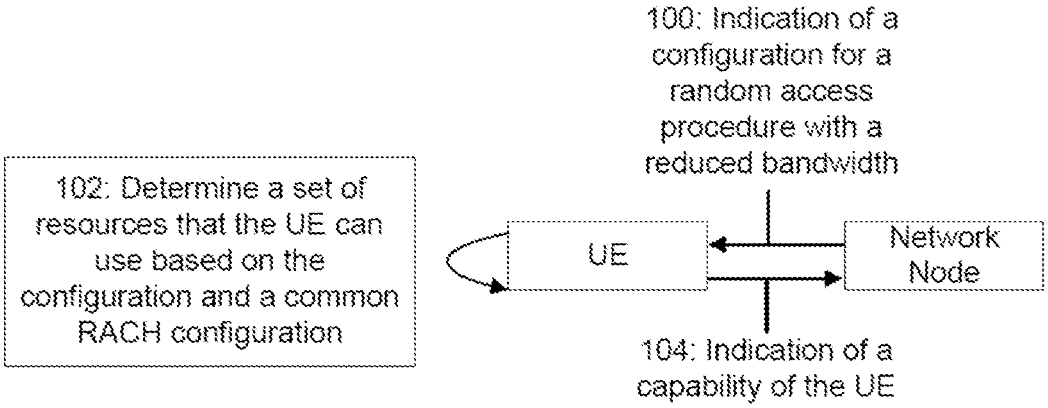
FIG. 1 illustrates an example of enabling access for a reduced capability NR device, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for enabling access for a reduced capability NR device is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

Support of reduced capability (REDCAP) NR devices is being considered for NR. The usage scenarios that have been identified for 5G are enhanced mobile broadband (eMBB), massive machine-type communication (mMTC), and Ultra-Reliable and Low Latency communication (URLLC). Yet another identified area to locate the boundary between mMTC and URLLC would be time sensitive communication (TSC). In particular, mMTC, URLLC, and TSC are associated with Internet of Things (IoT) use cases that are targeted in vertical industries. It is envisioned that eMBB, mMTC, URLLC, and TSC use cases may have to be supported in the same network.

In the 3GPP study on "self-evaluation towards IMT-2020 submission" it was confirmed that narrow band IoT (NB-IoT) and LTE-MTC (LTE-M) fulfill the IMT-2020 standards for mMTC and can be certified as 5G technologies. For URLLC support, URLLC features were introduced in Release 15 for both LTE and NR, and NR URLLC is further enhanced in Release 16 within the enhanced URLLC (eURLLC) and Industrial IoT work items. Rel-16 also introduced support for time-sensitive networking (TSN) and 5G integration for TSC use cases.

One important objective of 5G is to enable connected industries. 5G connectivity can serve as a catalyst for the next wave of industrial transformation and digitalization, which can improve flexibility, enhance productivity and efficiency, reduce maintenance cost, and improve operational safety. Devices in such an environment can include, for example, pressure sensors, humidity sensors, thermometers, motion sensors, accelerometers, actuators, etc. It is desirable to connect these sensors and actuators to 5G networks and cores. The massive industrial wireless sensor network (IWSN) use cases and needs may include URLLC services with very high requirements, and relatively low-end services with the requirement of small device form factors, and/or being completely wireless with a battery life of several years. The requirements for these services are higher than low power wide area (LPWA) (i.e., LTE-M/NB-IOT) but lower than URLCC and eMBB.

Similar to connected industries, 5G connectivity can serve as a catalyst for the next wave smart city innovations. As an example, some technical specifications describe smart city use cases and needs for that. The smart city vertical covers data collection and processing to more efficiently monitor and control city resources, and to provide services to city residents. The deployment of surveillance cameras is part of the smart city and of factories and industries.

Wearables use case include smart watches, rings, eHealth related devices, and medical monitoring devices. One characteristic for these use cases is that the device is small in size. As a baseline, the needs for these three use cases are: 1) generic needs: a) device complexity where the main motivation for the new device type is to lower the device cost and complexity as compared to high-end eMBB and URLLC devices of, for example, Rel-15/Rel-16 (this is especially the case for industrial sensors); b) device size where the need for most use cases is that the standard enables a device design with compact form factor; and c) deployment scenarios where a system should support all frequency range 1 (FR1)/frequency range 2 (FR2) bands for frequency division duplexing (FDD) and time division duplexing (TDD). In addition, there are use case specific needs: a) industrial wireless sensors where reference use cases and needs include communication service availability that is 99.99% and end-to-end latency less than 100 milliseconds (ms), where the reference bit rate is less than 2 megabits per second (Mbps) (potentially asymmetric, e.g., uplink (UL) heavy traffic) for use cases and the device is stationary, where the battery should last at least few years, and where, for safety related sensors, latency requirement is lower (e.g., 5-10 ms); b) video surveillance where reference economic video bitrate could be 2-4 Mbps with latency less than 500 ms and reliability of 99%-99.9%, where high-end video, e.g., for farming, could need 7.5-25 Mbps (these types of traffic patterns are often dominated by UL transmissions); and c) wearables where reference bitrate for smart wearable application can be 10-50 Mbps in downlink (DL) and a minimum of 5 Mbps in UL and peak bit rate of the device higher, 150 Mbps for downlink and 50 Mbps for uplink, and where battery of the device should last multiple days (up to 1-2 weeks). One objective is to identify and study potential UE complexity reduction features, including UE bandwidth reduction (synchronization signal block (SSB) bandwidth should be reused and layer 1 (L1) changes minimized).

As can be seen from the above, the reduced capability NR devices should be able to utilize the SSB bandwidth and, in general, the L1 changes should be minimized. Hence, it is assumed that the control resource set (CORESET) #0 bandwidth (BW) used to schedule and transmit all the system information messages, paging, as well as DL transmissions based on UE initial access via random access channel (RACH), is able to be used by the REDCAP NR devices. CORESET #0 is configured by master information block (MIB) and the bandwidth can be selected among {24,48,96} physical resource blocks (PRBs) to support different system/carrier bandwidth deployments. As the initial bandwidth part (BWP) restricts also the bandwidth of physical downlink shared channel (PDSCH) for broadcast, as noted above, it is most efficient to allocate this as wide as possible. The initial DL BWP that is configured in system information block 1 (SIB1) (which can have bandwidth of up to the system BW) is assumed to be used by the UE after receiving message 4 (Msg4) (RRCSetup/RRCReestablishment/RRCResume) which is why the NW should be able to identify UEs with reduced BW capabilities before sending the Msg4 for the UEs (since any scheduling commands over PDCCH sent by the network after this time point can be within the initial DL BWP).

However, the initial UL BWP, which is similarly configured in SIB1, is used right at the beginning by the UE, hence, the UL BW used for the random access procedure uses the initial UL BWP BW, which the REDCAP NR devices may not be able to support. RACH resources can be configured anywhere within the initial UL BWP in NR. The physical resources for RACH are configured by radio resource control (RRC) (e.g., information regarding a prach-ConfigurationIndex, a msg1-FDM, and a msg1-FrequencyStart included in a RACH-ConfigGeneric information element (IE) used to specify random access parameters for regular random access and beam failure recovery). In this case, the cell may have up to eight frequency division multiplexed physical RACH (PRACH) occasions at one time instant. One PRACH corresponds to 12 PRBs, hence, PRACH occasions may spread up to 96 PRBs worth of bandwidth within the initial UL BWP—this corresponds roughly to 20 megahertz (MHz) BW at 15 kHz subcarrier spacing (SCS).

The BWP concept allows a gNB to serve a UE with different BWP capabilities effectively by the same cell. However, the initial UL BWP the NW intends to use for regular NR UEs can likely be too wide for the REDCAP NR UEs. The problem is how the REDCAP NR devices can access the same cell with regular NR UEs with the maximum supported bandwidth of the REDCAP NR device being less than the BW of the initial BWP. Given that the DL messages of the random access procedure are scheduled over the CORESET #0 BW, as observed above, the main issue is the initial UL BWP.

One possible solution would be to allocate dedicated RACH resources for the REDCAP NR devices and by using those the NW would know already from the preamble indicating that the UE is a REDCAP NR UE. However, the RACH configuration can be large in NR (especially in FR2 cells) since preambles have to be allocated in each beam (SSB and/or channel state information reference signal (CSI-RS)) of the cell. Thus, given that all the system information is to be sent over the limited CORESET #0 bandwidth, allocating dedicated RACH resources for the purpose would be very costly in terms of overhead and network resource consumption (a large signalling burden for the NW and a reduction in the system capacity). Furthermore, legacy UEs could not use these resources.

Some embodiments described herein may provide for enabling access for a reduced capability NR device. For example, the NW (e.g., a network device) may indicate, in the system information, which of the configured RACH resources (e.g., PRACH occasions) can be used to perform a random access procedure within a reduced UL BW (compared to the whole initial UL BWP BW). Such configured RACH resources may be applicable to UEs accessing the cell. In certain embodiments, the NW may schedule a UL transmission (e.g., Msg3 (re-)transmission, etc.) pertaining to such random access procedure within the reduced UL BW. In this way, UEs can use the same RACH resources with the legacy/normal NR UEs and no dedicated RACH resources need to be configured. In addition, according to certain embodiments, support for initial access for REDCAP NR devices can be enabled with reduced signalling compared to other possible solutions, for example, with as little as a one bit addition in system information. Legacy/regular NR UEs may be able to use the same RACH resources normally as operations of these types of devices may not depend on within which BW (within the initial UL BWP) a message 3 (Msg3) is scheduled. Further, RACH resource handling can be optimized in the network implementations, according to some embodiments, as described herein.

FIG. 1 illustrates an example of enabling access for a reduced capability NR device, according to some embodiments. FIG. 1 illustrates a UE and a network node (e.g., a gNB) in communication with each other. The UE may be a REDCAP UE or a REDCAP NR UE, as described elsewhere herein.

As illustrated at 100, the network node may transmit, and the UE may receive, an indication of a configuration for a random access procedure within a reduced bandwidth. The network node may indicate, in system information, which of the configured RACH resources (e.g., PRACH occasions) can be used to perform the random access procedure within a reduced UL BW (compared to the whole initial UL BWP BW). The indication in the system information may be a one bit indication for the support of performing the random access procedure within a reduced UL BW. The network node may schedule UL transmissions (e.g., Msg3 (re-) transmissions, etc.) pertaining to such random access procedure within the reduced UL BW. The reduced UL BW can be configured separately (e.g., reduced UL initial BWP) in the system information, or it can be determined, for example, from the first RACH resource that may be indicated to apply within a reduced UL BW. Additionally, or alternatively, the reduced UL BW may correspond to the CORESET #0 BW used in the DL. In certain embodiments, the UE may use a hybrid/combined determination where, for instance, a start position in frequency for the UL BWP may be signalled in the system information and the UE may assume that the BW for the UL BWP is the same as the CORESET #0 BW.

The network node may indicate support for access by a UE. For example, this indication may be a one bit indication in the system information and/or may include the indication of the configuration for the reduced UL BW described above.

As illustrated at 102, the UE may determine a set of resources that the UE can use based on the configuration and a common RACH configuration. Based on such indication, the UE may determine the RACH resources it can use implicitly, for example, based on the RACH occasion(s) that fall within the BW of CORESET #0 or within the configured reduced UL BW. Based on the configuration of the reduced UL initial BWP, the UE can determine the valid RACH occasion(s) based on which of the RACH occasion(s) fall within the configured reduced UL BW (or reduced initial UL BWP). For instance, the UE may assume RACH occasions falling within CORESET #0 BW are permissible to use or based on a signalled index upwards/downwards from the CORESET #0 BW.

The network indication included in the system information may be time and/or frequency domain information that identifies what RACH resources can be used to perform the random access procedure within a reduced UL BW. For example, the UE may use time and/or frequency domain information provided by the network node and information identifying the RACH configuration by comparing which RACH occasions fall within such time and/or frequency domain information. The UE, in certain embodiments, may determine the set of resources based on determining that the UE is allowed to use the RACH resources identified in the system information or based on determining that the UE is allowed to use other RACH resources not identified in the system information. In some embodiments, a subset of the time domain resources may be allocated for use by the UEs.

For instance, since the RACH resources are common to UEs in the cell, the UE may determine the RACH resources that it is allowed to use, for instance, by assuming the RACH occasions falling within the reduced UL BWP bandwidth are permissible to use, by assuming RACH occasions starting from index #X (X may be signaled by the network node or may be the first index, e.g., index #0 or index #1) up to the RACH occasion index #Y that fall within the reduced UL BWP bandwidth are permissible to use, by assuming RACH occasions falling within CORESET #0 BW are permissible to use, and/or the like.

Certain embodiments may provide the following alternative or additional implementations. The UE may, prior to determining the set of resources, determine a common RACH configuration. The common RACH configuration may refer to, for instance, RACH occasions available to UEs accessing the cell, contention based random access (CBRA) resources within the RACH occasions available to UEs accessing the cell, etc. Additionally, or alternatively, the UE may, prior to determining the set of resources, determine whether the UE has received the indication described at 100. For example, the UE may determine whether an indication for configuration for random access with reduced bandwidth is received in system information. Additionally, or alternatively, the UE may, prior to determining the set of resources, determine the reduced bandwidth based on the configuration for the random access procedure. For example, in accordance with a determination that the indication for configuration for random access with reduced bandwidth is received, the UE may determine the reduced bandwidth based on the configuration. Additionally, or alternatively, and as described above with respect to determining the set of resources and based on the determining the reduced bandwidth and the common random access channel configuration, the UE may determine one or more random access occasions that can be accessed by the UE to request a transmission to be performed within the reduced bandwidth. Additionally, or alternatively, the UE may, after determining the set of resources, perform random access to the network node using the one or more random access occasions, similar to that described above. Additionally, or alternatively, the UE may determine, based on a response from the network node for the random access resources for the transmission, resources for the transmission and/or whether to transmit the transmission. Additionally, or alternatively, the UE may indicate, within the transmission, a capability of reduced bandwidth support for further scheduling by the network node.

As illustrated at 104, the UE may transmit, and the network node may receive, an indication of a capability of the UE. For example, the UE may indicate its reduced capability by means of Msg3 for the network node to be able to use reduced BW after the Msg4 transmission for both the UL and DL for the UE and/or to configure a reduced BW for the UE along with Msg4. Additionally, or alternatively, the UE may indicate its inability to support the configured initial BWP bandwidth, may indicate that it is a REDCAP NR UE, or a maximum supported bandwidth. The UE may indicate this inability in a Msg3 (e.g., within the RRC request message, such as a RRC Setup Request, a RRC Resume Request, a RRC Re-establishment Request, a RRC System Information Request, or another RRC message in Msg3, or in a medium access control (MAC) control element (CE), or L1 message like uplink control information (UCI)).

The UE may determine which 2-step RACH resources it is allowed to use by checking which of the PRACH occasions and associated PUSCH occasions fall within the BW of CORESET #0 or within the configured reduced UL BW. Similar to the above indication in Msg3, the UE may indicate, in a message A (MsgA), its inability to support the configured initial BWP BW, may indicate to be a REDCAP NR UE, or may indicate their maximum supported BW. In general, the UE may determine which 2-step RACH resources it is allowed to use by the same means as above described for 4-step RACH, however, the associated PUSCH occasions may have to be accounted for in addition to the PRACH occasions for 2-step RACH.

As described above, FIG. 1 is provided as an example. Other examples are possible, according to some embodiments.

Figure 2:
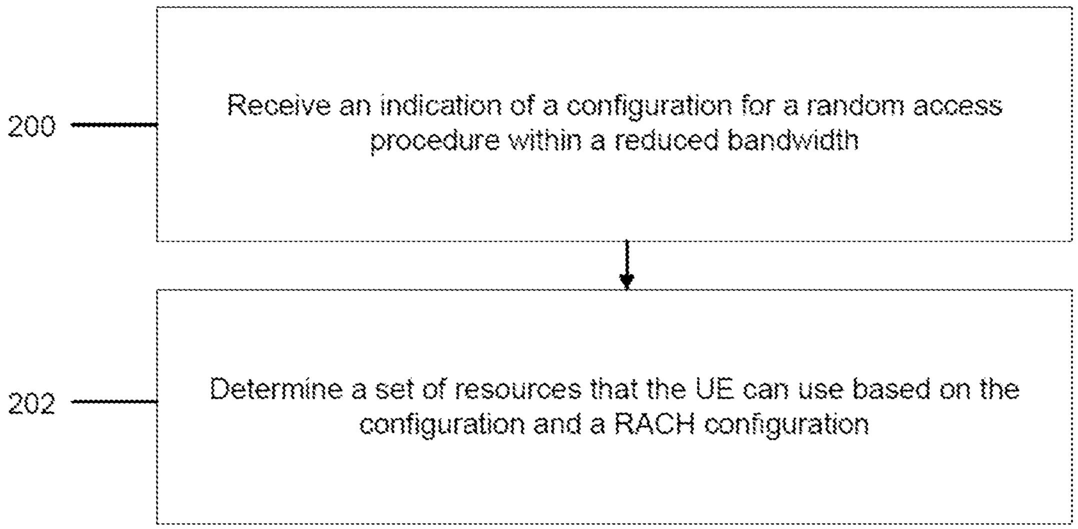
FIG. 2 illustrates an example flow diagram of a method, according to some embodiments.

FIG. 2 illustrates an example flow diagram of a method, according to some embodiments. For example, FIG. 2 shows example operations of a UE (e.g., apparatus 20). Some of the operations illustrated in FIG. 2 may be similar to some operations shown in, and described with respect to, FIG. 1.

In an embodiment, the method may include, at 200, receiving an indication of a configuration for a random access procedure within a reduced bandwidth. The method may include, at 202, determining a set of resources that the UE can use based on the configuration and a RACH configuration.

In some embodiments, the indication may be included in system information. In some embodiments, the indication may comprise one or more bits in the system information. In some embodiments, the indication may indicate one or more RACH resources that can be used to perform the random access procedure within the reduced bandwidth. In some embodiments, determining the set of resources may further comprise determining the set of resources based on the one or more indicated RACH resources.

In some embodiments, the indication may identify a first RACH resource that is within the reduced bandwidth. In some embodiments, determining the set of resources may further comprise determining the set of resources based on the first RACH resource. In some embodiments, the indication may identify a control resource set number 0 (CORESET #0) bandwidth. In some embodiments, determining the set of resources may further comprise determining the set of resources based on the CORESET #0 bandwidth.

In some embodiments, the indication may comprise time or frequency information that identifies a set of RACH resources that can be used to perform the random access procedure within the reduced bandwidth. In some embodiments, determining the set of resources may further comprise determining the set of resources based on the time or frequency information. In some embodiments, the determining the set of resources may further comprise determining that the UE is allowed to use the set of RACH resources, or determining that the UE is not allowed to use one or more other RACH resources not included in the set of RACH resources.

In some embodiments, the method may further comprise transmitting an indication of a capability of the UE. In some embodiments, the capability may comprise at least one of: a capability to use the reduced bandwidth, an inability to use an initial bandwidth that is wider than the reduced bandwidth, or a maximum supported bandwidth for the UE. In some embodiments, the method may further comprise determining the RACH configuration, and determining whether the UE has received the indication. In some embodiments, the method may further comprise determining the reduced bandwidth based on the configuration for the random access procedure.

In some embodiments, determining the set of resources may comprise determining one or more random access occasions that can be used to request that a transmission be performed within the reduced bandwidth. In some embodiments, the method may further comprise performing the random access procedure using the set of resources by transmitting or receiving one or more messages associated with the random access procedure. In some embodiments, the method may further comprise determining one or more random access resources to use for a transmission based on performing the random access procedure.

As described above, FIG. 2 is provided as an example. Other examples are possible according to some embodiments.

Figure 3:
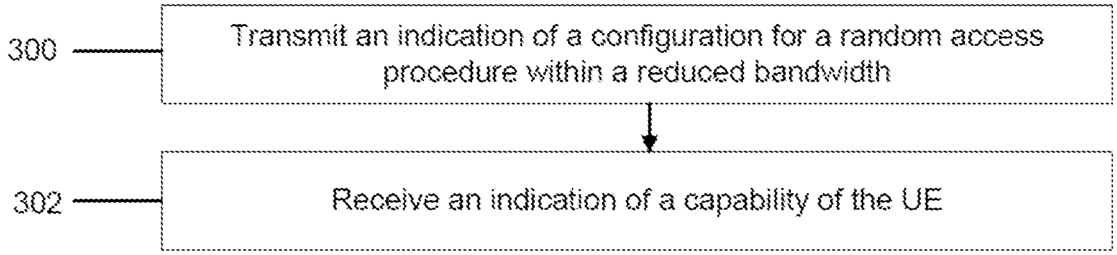
FIG. 3 illustrates an example flow diagram of a method, according to some embodiments.

FIG. 3 illustrates an example flow diagram of a method, according to some embodiments. For example, FIG. 3 shows example operations of a network node (e.g., apparatus 10). Some of the operations illustrated in FIG. 3 may be similar to some operations shown in, and described with respect to, FIG. 1.

In an embodiment, the method may include, at 300, transmitting an indication of a configuration for a random access procedure within a reduced bandwidth. The method may include, at 302, receiving an indication of a capability of the UE. The capability may comprise at least one of: a capability to use the reduced bandwidth, an inability to use an initial bandwidth that is wider than the reduced bandwidth, or a maximum supported bandwidth for the UE.

In some embodiments, the indication may be included in system information. In some embodiments, the indication may comprise one or more bits in the system information. In some embodiments, the indication may indicate one or more RACH resources that can be used to perform the random access procedure within the reduced bandwidth. In some embodiments, the indication may identify a first RACH resource that is within the reduced bandwidth.

In some embodiments, the indication may identify a control resource set number 0 (CORESET #0) bandwidth. In some embodiments, the indication may comprise time or frequency information that identifies a set of RACH resources that can be used to perform the random access procedure within the reduced bandwidth.

As described above, FIG. 3 is provided as an example. Other examples are possible according to some embodiments.

FIG. **4*a* illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), and/or a WLAN access point, associated with a radio access network, such as a LTE network, 5G or NR. In example embodiments, apparatus 10** may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 4*a*.

Figure 4A:
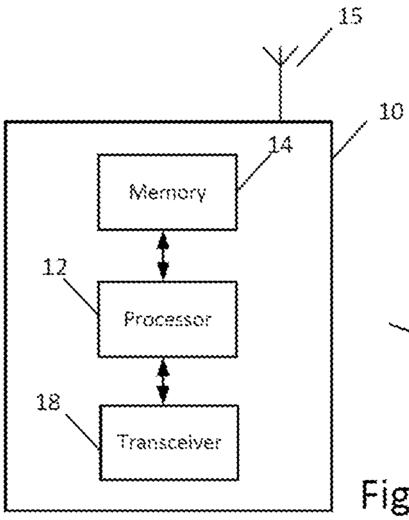
FIG. 4*a* illustrates an example block diagram of an apparatus, according to an embodiment.

As illustrated in the example of FIG. 4*a*, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4*a*, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna (s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations of flow or signaling diagrams illustrated in FIGS. 1-3.

For instance, in one embodiment, apparatus 10 may be controlled by memory 14 and processor 12 to transmit an indication of a configuration for a random access procedure within a reduced bandwidth. In one embodiment, apparatus 10 may be controlled by memory 14 and processor 12 to receive an indication of a capability of the UE. The capability may comprise at least one of: a capability to use the reduced bandwidth, an inability to use an initial bandwidth that is wider than the reduced bandwidth, or a maximum supported bandwidth for the UE.

Figure 4B:
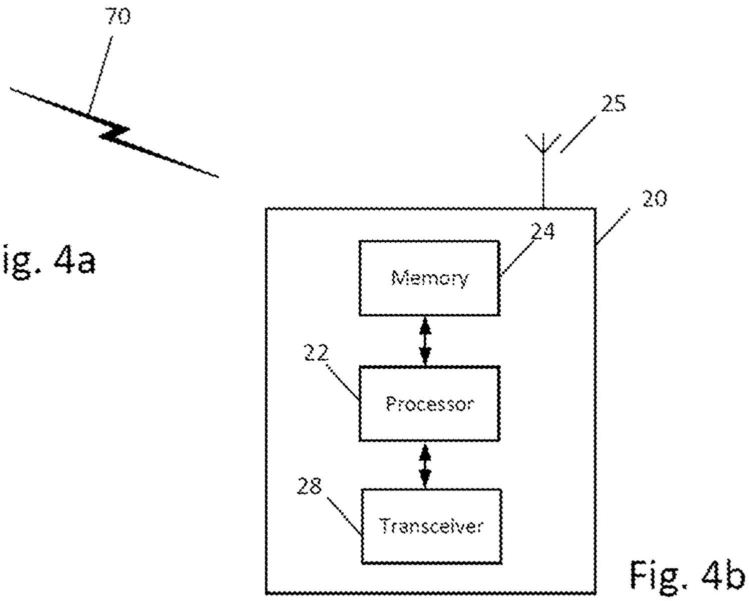
FIG. 4*b* illustrates an example block diagram of an apparatus, according to another embodiment.

FIG. 4*b* illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 4*b*.

As illustrated in the example of FIG. 4*b*, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4*b*, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIGS. 1-3.

For instance, in one embodiment, apparatus 20 may be controlled by memory 24 and processor 22 to receive an indication of a configuration for a random access procedure within a reduced bandwidth. In one embodiment, apparatus 20 may be controlled by memory 24 and processor 22 to determine a set of resources that the UE can use based on the configuration and a RACH configuration.

Therefore, certain example embodiments provide several technological improvements, enhancements, and/or advantages over existing technological processes. For example, one benefit of some example embodiments is enablement of access for reduced capability UEs with reduced signaling compared to other possible solutions. Accordingly, the use of some example embodiments results in improved functioning of communications networks and their nodes and, therefore constitute an improvement at least to the technological field of UE access, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

PARTIAL GLOSSARY

BW Bandwidth
BWP Bandwidth Part
FR Frequency Range
REDCAP Reduced Capability

The invention claimed is:

1. An apparatus comprising:
at least one processor; and
at least one memory comprising instructions stored thereon that, when executed by the at least one processor, cause the apparatus to perform at least:
receiving, in system information, an indication of a configuration indicating one or more configured random access channel resources for performing a random access procedure within a reduced bandwidth compared to an initial uplink bandwidth part, wherein the initial uplink bandwidth part is configured in the received system information; and
determining random access channel resources permissible for use by the apparatus based on the configuration and a common random access channel configuration,
wherein the common random access channel configuration refers to random access channel occasions, and wherein the random access channel resources permissible for use by the apparatus comprise one or more random access channel occasions of the common random access channel configuration that fall within the reduced bandwidth.

2. The apparatus of claim 1, wherein the indication comprises one or more bits in the system information.

3. The apparatus of claim 1, wherein the indication indicates one or more random access channel resources that can be used to perform the random access procedure within the reduced bandwidth; and
wherein the instructions stored on the at least one memory, when executed by the at least one processor, further cause the apparatus to perform:

determining the random access channel resources permissible for use by the apparatus based on the one or more indicated random access channel resources.

4. The apparatus of claim 1, wherein the indication identifies a first random access channel resource that is within the reduced bandwidth; and wherein the instructions stored on the at least one memory, when executed by the at least one processor, further cause the apparatus to perform the determining the random access channel resources permissible for use by the apparatus by causing the apparatus to perform:

determining the random access channel resources permissible for use by the apparatus based on the first random access channel resource.

5. The apparatus of claim 1, wherein the indication comprises time or frequency information that identifies a set of random access channel resources that can be used to perform the random access procedure within the reduced bandwidth; and wherein the instructions stored on the at least one memory, when executed by the at least one processor, further cause the apparatus to perform the determining the random access channel resources permissible for use by the apparatus by causing the apparatus to perform:

determining the random access channel resources permissible for use by the apparatus based on the time or frequency information.

6. The apparatus of claim 1, wherein the instructions stored on the at least one memory, when executed by the at least one processor, further cause the apparatus to perform at least:

determining that the apparatus is allowed to use the random access channel resources permissible for use by the apparatus, or determining that the apparatus is not allowed to use one or more other random access channel resources not included in the random access channel resources permissible for use by the apparatus.

7. The apparatus of claim 1, wherein the instructions stored on the at least one memory, when executed by the at least one processor, further cause the apparatus to perform at least:

transmitting an indication of a capability of the apparatus, wherein the capability of the apparatus comprises at least one of:

a capability of the apparatus to use the reduced bandwidth, an inability of the apparatus to use an initial bandwidth that is wider than the reduced bandwidth, or a maximum supported bandwidth for the apparatus.

8. The apparatus of claim 1, wherein the instructions stored on the at least one memory, when executed by the at least one processor, further cause the apparatus to perform at least:

determining the configured random access channel resources; and determining whether the apparatus has received the indication.

9. The apparatus of claim 1, wherein the instructions stored on the at least one memory, when executed by the at least one processor, further cause the apparatus to perform:

determining the reduced bandwidth based on the configuration for the random access procedure.

10. The apparatus of claim 1, wherein the instructions stored on the at least one memory, when executed by the at least one processor, further cause the apparatus to perform, when determining the random access channel resources permissible for use by the apparatus:

determining one or more random access occasions that can be used to request that a transmission be performed within the reduced bandwidth.

11. The apparatus of claim 1, wherein the instructions stored on the at least one memory, when executed by the at least one processor, further cause the apparatus to perform:

performing the random access procedure using the random access channel resources permissible for use by the apparatus by transmitting or receiving one or more messages associated with the random access procedure.

12. The apparatus of claim 11, wherein the instructions stored on the at least one memory, when executed by the at least one processor, further cause the apparatus, when determining the random access channel resources permissible for use by the apparatus, to perform:

determining one or more random access resources to use for a transmission based on performing the random access procedure.

13. A method comprising:

receiving, by a user equipment, in system information, an indication of a configuration indicating one or more configured random access channel resources for performing a random access procedure within a reduced bandwidth compared to an initial uplink bandwidth part, wherein the initial uplink bandwidth part is configured in the received system information; and determining, by the user equipment, random access channel resources permissible for use by the user equipment based on the configuration and a common random access channel configuration, wherein the common random access channel configuration refers to random access channel occasions, and wherein the random access channel resources permissible for use by the user equipment comprise one or more random access channel occasions of the common random access channel configuration that fall within the reduced bandwidth.

14. The method of claim 13, wherein the common random access channel configuration refers to random access channel configurations.

15. The method of claim 13, wherein the determining the random access channel resources permissible for use by the user equipment is based on one or more of:

one or more indicated random access channel resources, a first random access channel resource within the reduced bandwidth that is identified by the indication, or time or frequency information comprised in the indication.

16. The method of claim 13, further comprising:

transmitting, using the user equipment, an indication of a capability of the user equipment, wherein the capability of the user equipment comprises at least one of:

a capability of the user equipment to use the reduced bandwidth, an inability of the user equipment to use an initial bandwidth that is wider than the reduced bandwidth, or a maximum supported bandwidth for the user equipment.

17. The method of claim 13, further comprising:

determining the reduced bandwidth based on the configuration for the random access procedure.

18. The method of claim 13, further comprising:

performing the random access procedure using the random access channel resources permissible for use by the user equipment by transmitting or receiving one or more messages associated with the random access procedure.

* * * * *